United States Patent

Altunbasak et al.

(10) Patent No.: US 6,834,128 B1
(45) Date of Patent: Dec. 21, 2004

(54) IMAGE MOSAICING SYSTEM AND METHOD ADAPTED TO MASS-MARKET HAND-HELD DIGITAL CAMERAS

(75) Inventors: Yucel Altunbasak, Atlanta, GA (US); Alexander I. Drukarev, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 340 days.

(21) Appl. No.: 09/596,133

(22) Filed: Jun. 16, 2000

(51) Int. Cl.[7] .................................................. G06K 9/36
(52) U.S. Cl. ........................ 382/284; 382/282; 382/294; 348/49; 348/50; 358/450; 358/453
(58) Field of Search ................................ 382/282, 284, 382/289, 287, 298, 291, 293, 294, 295, 302; 358/450, 452, 453, 465; 348/49, 50, 64, 194, 155, 207.1, 208.4

(56) References Cited

U.S. PATENT DOCUMENTS

| | | | | |
|---|---|---|---|---|
| 5,940,641 A | * | 8/1999 | McIntyre et al. | 396/332 |
| 5,963,664 A | * | 10/1999 | Kumar et al. | 382/154 |
| 5,999,662 A | | 12/1999 | Burt et al. | 382/284 |
| 6,009,190 A | * | 12/1999 | Szeliski et al. | 382/154 |
| 6,057,909 A | * | 5/2000 | Yahav et al. | 356/5.04 |
| 6,075,905 A | * | 6/2000 | Herman et al. | 382/284 |
| 6,097,854 A | * | 8/2000 | Szeliski et al. | 382/284 |
| 6,157,747 A | * | 12/2000 | Szeliski et al. | 382/284 |
| 6,173,087 B1 | * | 1/2001 | Kumar et al. | 382/284 |
| 6,266,068 B1 | * | 7/2001 | Kang et al. | 345/629 |
| 6,271,876 B1 | * | 8/2001 | McIntyre et al. | 348/46 |
| 6,362,851 B1 | * | 3/2002 | Lavelle et al. | 348/333.01 |
| 6,393,163 B1 | * | 5/2002 | Burt et al. | 382/294 |
| 6,518,975 B1 | * | 2/2003 | Kulkarni et al. | 345/589 |
| 6,535,243 B1 | * | 3/2003 | Tullis | 348/207.1 |

* cited by examiner

Primary Examiner—Bhavesh M. Mehta
Assistant Examiner—Yosef Kassa (57) ABSTRACT

An imaging system includes a camera for capturing image frames, a frame pre-screen unit for pre-screening the captured image frames, a frame store unit for storing the pre-screened frames, and a refined frame mosaicing unit for generating a refined mosaic from the pre-screened image frames that are stored in the frame store unit. The frame pre-screen unit may include a coarse align unit for generating a coarse image mosaic from the pre-screened image frames, and a display for displaying the coarse image mosaic. In an embodiment, the coarse image mosaic is generated and displayed in real-time relative to the image frames that are captured by the camera. In an embodiment of the imaging system, the display is located within the camera and in another embodiment, the frame pre-screen unit and the frame store unit are located within the camera.

19 Claims, 7 Drawing Sheets

Captured Frames

FIG. 4

Stored Frames

IMAGE MOSAICING SYSTEM AND METHOD ADAPTED TO MASS-MARKET HAND-HELD DIGITAL CAMERAS

FIELD OF THE INVENTION

The invention relates to creating a still image from multiple images, and more specifically to an image capture and processing system that enables image mosaicing.

BACKGROUND OF THE INVENTION

Image mosaicing involves stitching together multiple separate sets of image information to create a composite still image. In particular, image mosaicing involves stitching together frames of digital image information that are captured by digital still cameras or digital video cameras. Image mosaicing is often utilized to generate a single panoramic image from a series of individual images.

The process of generating a high-quality image mosaic requires large digital storage and processing capacity. In order to provide the storage and processing capacity needed to create a high-quality image mosaic, a still or video digital camera can be connected to a personal computer equipped with an image mosaicing application. Image information captured by the digital camera is dumped directly from the digital camera to the personal computer and stitched together by the mosaicing application into an image mosaic. The image mosaic generated by the personal computer can be viewed through the personal computer, printed, edited, and/or permanently stored. A stand-alone digital camera could be used to capture a sequence of images and to generate a high-quality image mosaic, however, the processing and storage capacity that are required to generate a high-quality image mosaic would be cost prohibitive for typical mass-market hand-held digital cameras.

During the capture of image information that is to be utilized to create an image mosaic, it is desirable to view at least an approximate image mosaic in real-time in order to determine if the target scene has been entirely captured. However, real-time image mosaic building is an expensive operation, requiring more memory and processing power than is available in mass-market hand-held digital cameras.

In view of the limitations of known image mosaicing systems, what is needed is a system and method that enables image mosaicing to be accomplished through hand-held mass-market digital cameras. In addition, what is needed is a system and method that enables real-time display of image mosaics.

SUMMARY OF THE INVENTION

In an embodiment of the invention, an imaging system includes a camera for capturing image frames, a frame pre-screen unit for pre-screening the captured image frames, a frame store unit for storing the pre-screened frames, and a refined frame mosaicing unit for generating a refined mosaic from the pre-screened image frames that are stored in the frame store unit. Because frames are pre-screened by the frame pre-screen unit, the most useful frames for image mosaicing can be stored while less useful frames are discarded, thereby conserving limited storage capacity.

In an embodiment of the imaging system, the frame pre-screen unit also includes a coarse align unit for generating a coarse image mosaic from the pre-screened image frames, and a display for displaying the coarse image mosaic. In an embodiment, the coarse image mosaic is generated and displayed in real-time relative to the image frames that are captured by the camera.

In an embodiment of the imaging system, the display is located within the camera and in another embodiment, the frame pre-screen unit and the frame store unit are located within the camera.

In another embodiment of the invention, a hand-held camera includes a lens and detector array for capturing image frames, a frame pre-screen unit for pre-screening captured image frames, a display for displaying a coarse image mosaic of the pre-screened image frames, a frame store unit for storing the pre-screened image frames, and a data transfer system for transferring the pre-screened image frames from the frame store unit to a support system that generates a refined image mosaic from the pre-screened image frames.

In an embodiment of the hand-held camera, the frame pre-screen unit includes a coarse motion tracking unit for tracking the motion of the captured image frames and generating coarse motion vectors, a frame reject unit for rejecting a first image frame if the coarse motion vector of the first image frame does not exceed a motion threshold and for providing the first image frame to the frame store unit if the coarse motion vector does exceed the motion threshold, and a coarse align unit for generating the coarse image mosaic from the image frames having coarse motion vectors that exceed the motion threshold.

In another embodiment of the invention, an imaging system includes a camera and a support computer system connected to the camera by a real-time communications link. The camera includes a lens and detector array for capturing image frames. The support computer system includes a frame pre-screen unit for pre-screening the image frames that are captured by the camera and for outputting pre-screened image frames, a coarse align unit for generating a coarse image mosaic from the pre-screened image frames, a frame store unit for storing the pre-screened image frames that are output from the frame pre-screening unit, a refined image mosaicing unit for generating a refined image mosaic from the pre-screened image frames that are stored in the frame store unit, and a display for displaying the coarse image mosaic and the refined image mosaic.

In another embodiment of the invention, an image mosaicing method involves capturing image frames, making a coarse motion determination for a first image frame relative to a reference frame with the coarse motion determination being represented as a coarse motion vector, comparing the coarse motion vector for the first image frame to a motion threshold, rejecting the first image frame if the coarse motion vector for the first image frame does not exceed the motion threshold, and storing the first image frame if the coarse motion vector for the first image frame exceeds the motion threshold. An embodiment of the method includes an additional step of aligning image frames having coarse motion vectors that exceed the motion threshold to create a coarse image mosaic.

An advantage of the systems and method is that coarse image mosaics can be generated and displayed in real-time through a hand-held digital camera without large storage and processing capacity. Another advantage is that the pre-screened image frames can be utilized by a support computer system to generate refined image mosaics.

DETAILED DESCRIPTION

Figure 1:
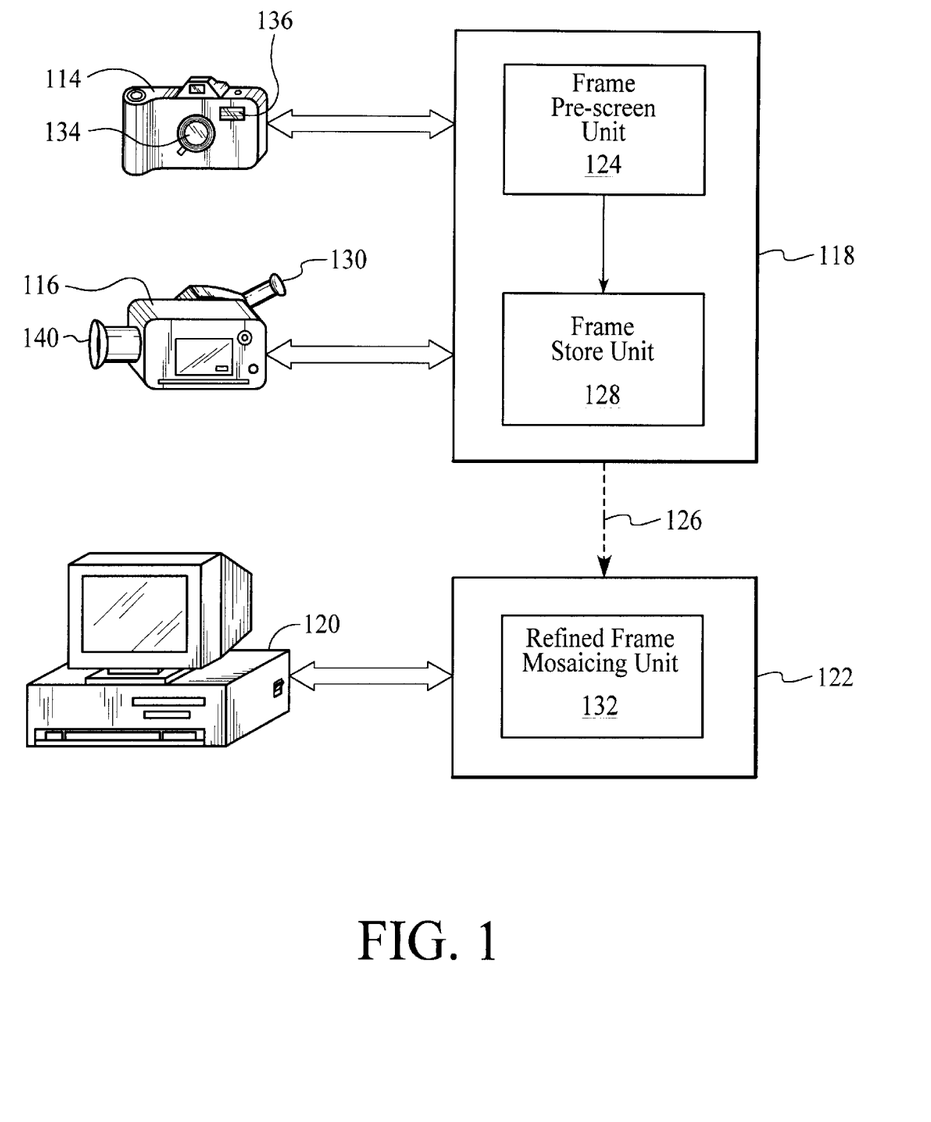
FIG. 1 is a depiction of an image capture device, such as a hand-held digital still camera or a hand-held digital video camera, that includes a frame pre-screen unit and a frame store unit, in addition to a support computer system, such as a personal computer, that includes a refined frame mosaicing unit in accordance with one embodiment of the invention.

FIG. 1 is a depiction of one embodiment of an image mosaic system that includes an image capture device such as a hand-held digital still camera 114 or a hand-held digital video camera 1116 and a support computer system such as a personal computer 120. The functional unit 118 (as indicated by the block on the right) supported by the digital cameras includes a frame pre-screen unit 124 and a frame store unit 128. The functional unit 122 supported by the personal computer includes a refined frame mosaicing unit 132. Operation of the functional units and their relationship to the each other are described in detail below.

The hand-held digital still camera (still camera) 114 includes a digital camera that captures digital still frames through an imaging lens and photodetector array combination 134. As is described in more detail below the still camera contains enough processing capacity to perform a frame pre-screening function and enough storage capacity to store multiple image frames. The still camera may also include a display 136 such as a liquid crystal display for displaying individual image frames and/or an image mosaic as is described below.

The hand-held digital video camera (video camera) 116 includes a digital camera that captures digital video frames through an imaging lens and photodetector array combination 140. As is described in more detail below the video camera contains enough processing capacity to perform the frame pre-screening function and enough storage capacity to store a series of digital frames. The video camera includes a display 130 that displays, in real-time, the image frames that are being captured and/or an image mosaic as is described below.

The personal computer 120 includes enough processing and storage capacity to perform detailed image mosaicing. That is, the personal computer supports image mosaicing applications that generate a combined image from frames of digital information that are supplied by the still camera or the video camera. In an embodiment, a mosaicing application is resident in the personal computer and in other embodiments, a mosaicing application is accessed via a computer network such as the Internet. In another embodiment, the support computer system that performs the detailed image mosaicing is integrated into the image capture device and in another embodiment, the support computer system involves custom hardware that is directly connected.

In order to describe the unique aspects of the image mosaicing system depicted in FIG. 1, it is first necessary to describe the basic image capture and image mosaicing processes that occur whether a still camera or a video camera is utilized to capture image frames. In the image capture process, a digital camera is swept across an area to capture a series of image frames. In the case of the still camera, images are captured at a rate such that each frame shares some common image information with previous frames. As is known in the art, the minimum rate of image capture is related to the rate of motion of the camera. In the case of the video camera, images are captured at standard video capture rates such that each video frame contains some image information in common with temporally near frames. In an embodiment, image frames are stored in the audio-video interleave (AVI) file format although this is not critical.

Whether image frames are captured by a still camera or a video camera, the captured image frames are stitched together into an image mosaic by comparing common patterns between a target frame and a reference frame and then determining a motion vector of the target frame relative to the reference frame. The target frame is then aligned with an image mosaic according to its motion vector to create an image mosaic that includes image information from multiple image frames.

In some cases, captured image frames contain little, if any, image information that adds significantly to an image mosaic. For example, if a camera is not moved, or only slightly moved, while shooting a static background, each new frame is basically the same as previous frames. Identifying and rejecting frames that add little, if any, new image information to an image mosaic is an aspect of the invention that is described below.

Referring back to FIG. 1, the function of each individual functional unit is described individually and then operation of the entire image mosaic system is described. The function of the frame pre-screen unit 124 is to analyze each newly captured frame against a reference frame and to identify which frames contain enough new information that they should be included in the image mosaic. Stated in the alternative, the function of the frame pre-screen unit is to analyze each newly captured frame against a reference frame and to identify which frames contain so little new information that they can be discarded without adversely effecting the quality of the image mosaic. The function of the frame store unit 128 is to store the pre-screened frames that are output by the frame pre-screen unit. The frame store unit may include random access memory (RAM) and/or permanent memory such as a removable memory card, a magnetic disk, a magnetic tape, or an optical memory device.

Figure 2:
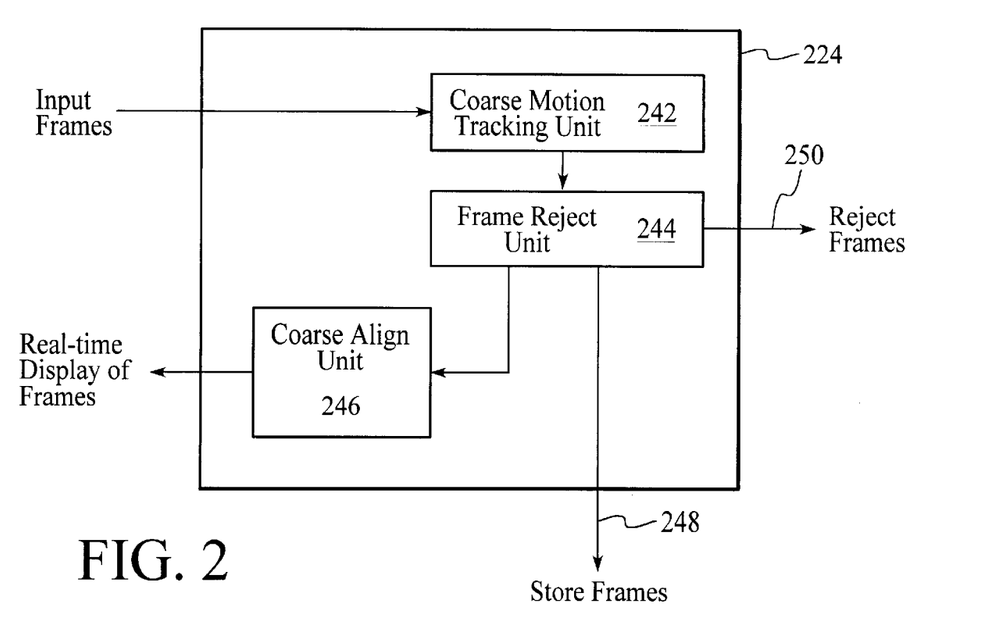
FIG. 2 is a detailed depiction of the frame pre-screen unit of FIG. 1.

An embodiment of a frame pre-screen unit 224 is depicted in more detail in FIG. 2. The frame pre-screen unit includes a coarse motion tracking unit 242, a frame reject unit 244, and a coarse align unit 246. The coarse motion tracking unit provides an estimate of the motion of captured image frames relative to a reference image utilizing a relatively basic motion algorithm that requires less processing capability than other more accurate motion algorithms. In an embodiment, the coarse motion tracking unit obtains estimates of the horizontal and vertical motion of frames in an accuracy range of one to two pixels. The coarse motion tracking unit generates coarse motion vectors that reflect the calculated motion between image frames and the reference image.

Once the coarse motion tracking unit 242 has determined the coarse motion vector for an image frame, the image frame is passed to the frame reject unit 244. The frame reject unit compares the calculated motion of the image frame, as indicated by the coarse motion vector, to a pre-established motion threshold. The motion threshold is an adjustable threshold that establishes the amount of motion that is required between image frames that are to be included in the image mosaic. In an embodiment, the motion threshold is established to retain the minimum number of frames required to capture an image.

If the motion of the subject image frame exceeds the motion threshold, then the subject image frame along with its respective motion vector are forwarded for storage as indicated by arrow 248. If the motion of the subject image frame does not exceed the motion threshold, then the subject image frame along with its respective motion vector are rejected as indicated by arrow 250. In an embodiment where storage space is limited, rejection of an image frame may involve dropping the image frame from memory. In an embodiment where storage space is readily available, rejection of an image frame may involve tagging, or otherwise identifying, the rejected image frame. Image frames having motion vectors that exceed the motion threshold are forwarded for storage and are considered pre-screened image frames. The pre-screened image frames are transferred from the camera 114 or 116 via a data transfer system 126 to the support computer system 120 so that the refined frame mosaicing unit 132 may generate a refined image mosaic. In an embodiment, the data transfer system is a communication link such as a wire or wireless link. In other embodiments, the data transfer system involves the transfer of a removable storage medium such as a removable memory card, a magnetic disk, a magnetic tape, or an optical memory device.

Figure 3:
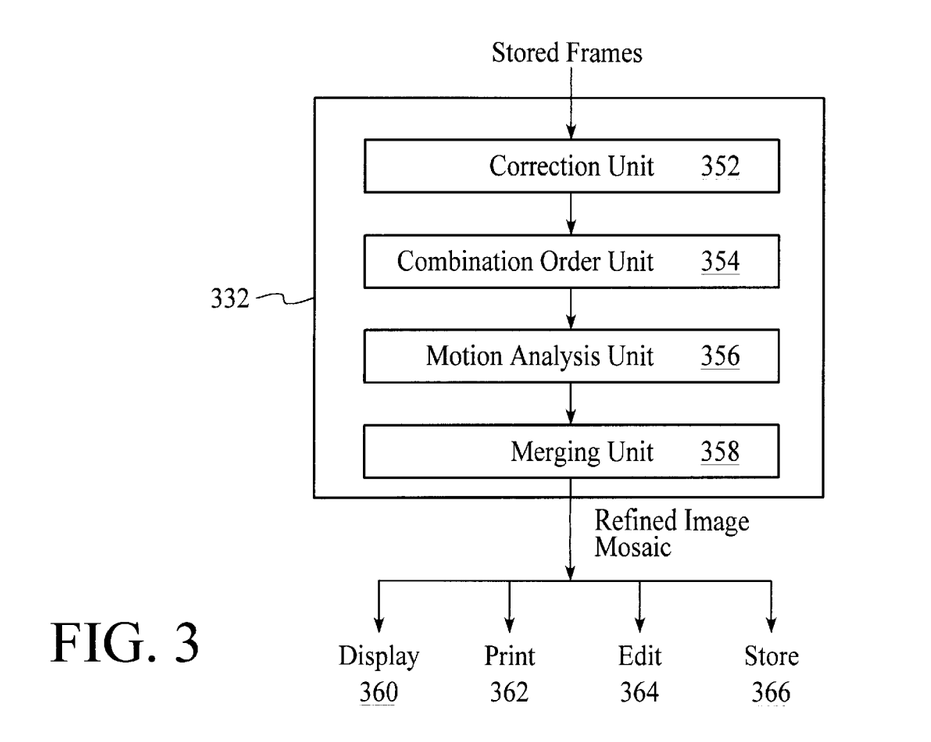
FIG. 3 is a detailed depiction of the refined frame mosaicing unit of FIG. 1.

Referring back to the support computer system of FIG. 1, the refined frame mosaicing unit 132 may include multiple sub-units. FIG. 3 is a depiction of an embodiment of a refined frame mosaicing unit 332. The refined frame mosaicing unit includes a correction unit 352, a combination order unit 354, a motion is analysis unit 356, and a merging unit 358. The correction unit unwarps geometric lens distortions that may be present in the pre-screened image frames. The combination order unit determines the order in which the pre-screened image frames are to be stitched together. In an embodiment, the pre-screened image frames are stitched together in temporal order based on their time of capture however other factors may determine the order of stitching. The motion analysis unit makes a more detailed determination of the motion between the pre-screened image frames and a reference image frame. Because the motion analysis unit is supported by the processing capacity of the personal computer, robust motion analysis algorithms may be utilized to more precisely determine the motion between the pre-screened image frames and a reference image frame. The motion analysis unit may utilize the coarse motion vectors that are generated in the pre-screening process to aid in the detailed motion analysis. The merging unit aligns the image frames based on the motion analysis and then stitches the image frames into the image mosaic. Because the merging process is supported by the processing capacity of the personal computer, robust stitching algorithms may be utilized by the merging unit to create a high-quality image mosaic. Although a particular refined frame mosaicing unit is described, it should be understood that other frame mosaicing systems and techniques that are known in the art may be utilized to stitch together the pre-screened image frames.

Once a refined image mosaic is generated, the refined image mosaic can be utilized in various ways. For example, the refined image mosaic may be displayed 360 through the personal computer, printed 362 onto paper, electronically edited 364, and/or permanently stored 366.

Figure 4:
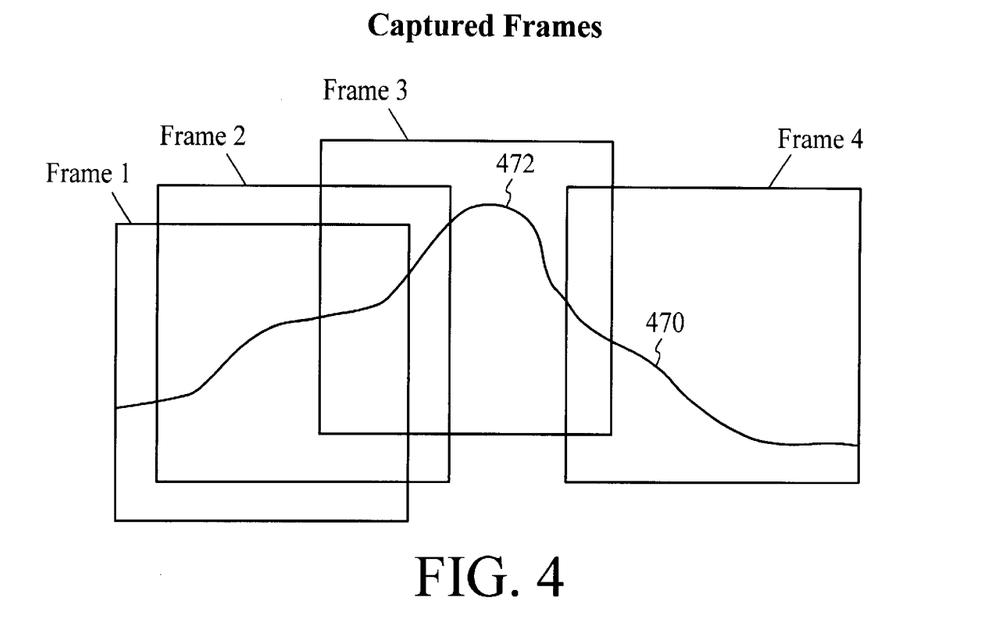
FIG. 4 represents a sequence of four captured image frames before frame pre-screening.

Operation of the system is described with reference to FIGS. 1–3 and FIGS. 4 and 5. FIG. 4 represents an example sequence of image frames that is captured by a digital camera, either a still camera or a video camera. The sequence of image frames captures a panoramic view of a horizon line 470 that includes a mountain peak 472. As shown in FIG. 4 there are four individual image frames in the sequence that are captured by panning the camera across the horizon. The image frames includes frame 1, frame 2, frame 3, and frame 4.

Referring back to FIG. 2, the four image frames are input into the coarse motion tracking unit 242 of the frame pre-screening unit 224. The coarse motion tracking unit determines the motion of each frame relative to a reference frame. In this case, it is assumed that frame 1 is utilized as the reference frame and the motion of frames 2–4 is determined relative to frame 1. The coarse motion tracking unit determines the motion of frame 2 relative to frame 1, as described above, and passes the image frame (frame 2) and a respective coarse motion vector to the frame reject unit 244. The frame reject unit compares the coarse motion vector for frame 2 to a motion threshold and determines if frame 2 represents enough motion that the frame should be stored and subsequently added to the image mosaic. For example purposes, it is assumed that the motion of frame 2 does not exceed the motion threshold and therefore frame 2 and the accompanying coarse motion vector are rejected. In an embodiment, the rejected image frame and accompanying coarse motion vector are flushed from memory, while in other embodiments the rejected image frame and accompanying coarse motion vector are tagged with an identifier and saved. Next, the coarse motion tracking unit determines the motion of frames 3 and 4 utilizing the same approach. For example purposes, it is assumed that the calculated coarse motion vectors for frames 3 and 4 both exceed the motion threshold and therefore the frames and accompanying coarse motion vectors are passed to the frame store unit.

Figure 5:
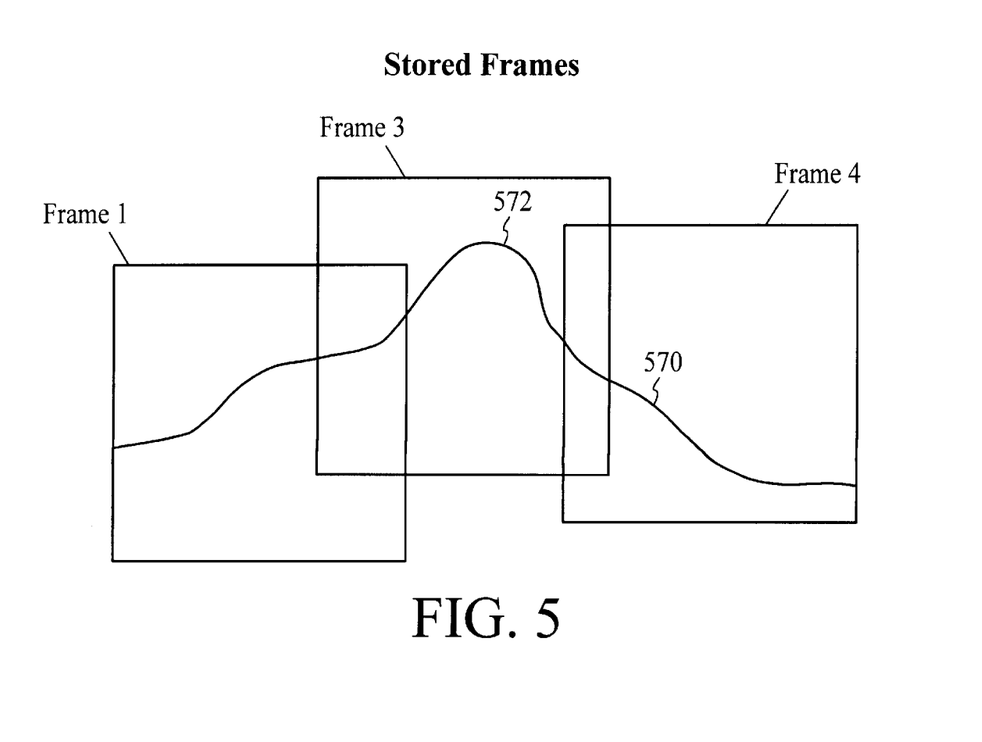
FIG. 5 represents the three remaining image frames from FIG. 4 after frame pre-screening.

FIG. 5 depicts the three pre-screened image frames (frame 1, frame 3, and frame 4) that remain for storage after the frame pre-screening process. Frame 2 has been rejected and is no longer represented in FIG. 5. As can be seen from FIGS. 4 and 5, the amount of unique image information provided by frame 2 to the overall image mosaic is relatively small when compared to the amount of redundant image information provided by frame 2. In systems where storage and processing power are limited, removing redundant image frames allows a more expansive image mosaic to be captured.

Referring back to FIG. 2, in an embodiment of the imaging system that supports real-time display of a coarse image mosaic, the pre-screened image frames and accompanying coarse motion vectors are forwarded to the coarse align unit 246. The coarse align unit aligns the pre-screened image frames utilizing the coarse motion vectors that are generated by the coarse motion tracking unit. The coarse align unit generates, in real-time, a roughly aligned image mosaic of the pre-screened image frames that can be viewed from, for example, an on-camera display. The visual feedback provided from real-time display of a coarse image mosaic helps to ensure that the desired image information has been captured. Because the number of image frames is controlled by pre-screening and because the image mosaic is only roughly aligned from the coarse motion vectors, the coarse image mosaic can be generated in real-time by a hand-held camera having limited processing and storage capacity.

Whether the imaging system supports real-time display of a coarse image mosaic or not, the pre-screened image frames (including the respective coarse motion vectors) that are stored in the camera are downloaded to the support computer system. The downloading process may involve transferring a storage medium, such as a removable disk or tape from the camera to a personal computer or it may involve connecting the camera and the personal computer through a cable or wireless link and electronically transferring the pre-screened and stored image frames from the camera to the personal computer. Once the pre-screened image frames are transferred to the personal computer, the pre-screened image frames are accessed by the refined frame mosaicing unit 332 and a refined image mosaic is generated as described with reference to FIG. 3. The refined image mosaic can be displayed, printed, edited, and/or permanently stored.

Figure 6:
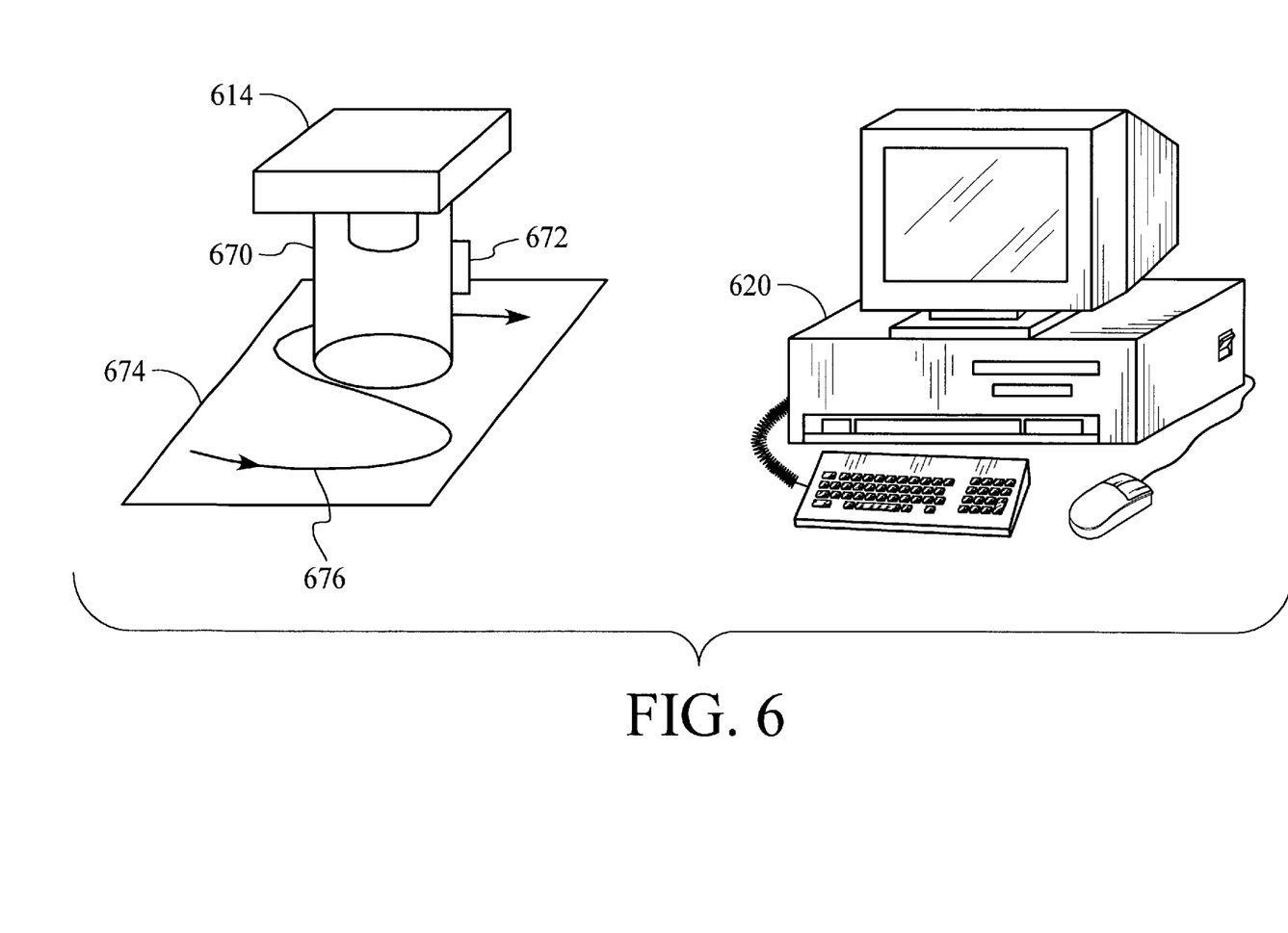
FIG. 6 is a depiction of an imaging system that includes a still camera and a support structure that are not directly connected to a support computer system during frame capture.

FIG. 6 is an embodiment of an imaging system that is related to FIG. 1 in which a still camera 614 is utilized in conjunction with a support computer system 620 to create an image scanning system. In the embodiment of FIG. 6, the still camera is not directly connected to the support computer system (personal computer) during the image capture and pre-screening processes. As shown in FIG. 6, a support structure 670 is utilized with the still camera to fix the distance between the camera and a target object 674, such as a piece of printed paper, which is to be scanned. The still camera or the support structure may also include a light source 672 as necessary to illuminate the target object. Although the embodiment of FIG. 6 depicts a still camera, a video camera may alternatively be utilized in the image scanning system. In other possible embodiments of the imaging system, a hand-held digital camera without a support element can be used.

In operation, the camera shown in FIG. 6 is swept in a path 676 across the printed paper and image frames are captured. In an embodiment, image frames are captured at an interval of one thirtieth of a second. As described above with reference to FIGS. 1–5, the camera 614 captures image frames, pre-screens the captured image frames, and stores the pre-screened image frames. In an embodiment, a coarse image mosaic is displayed in real-time through an on-camera display device. The real-time display of the coarse image mosaic enables an operator of the camera to determine if the target object has been adequately scanned. After the image frames are captured and pre-screened, the camera is linked to the personal computer 620 and the pre-screened image frames and coarse motion information are utilized to create a refined image mosaic that can be viewed, printed, edited, and/or stored as described above.

Figure 7:
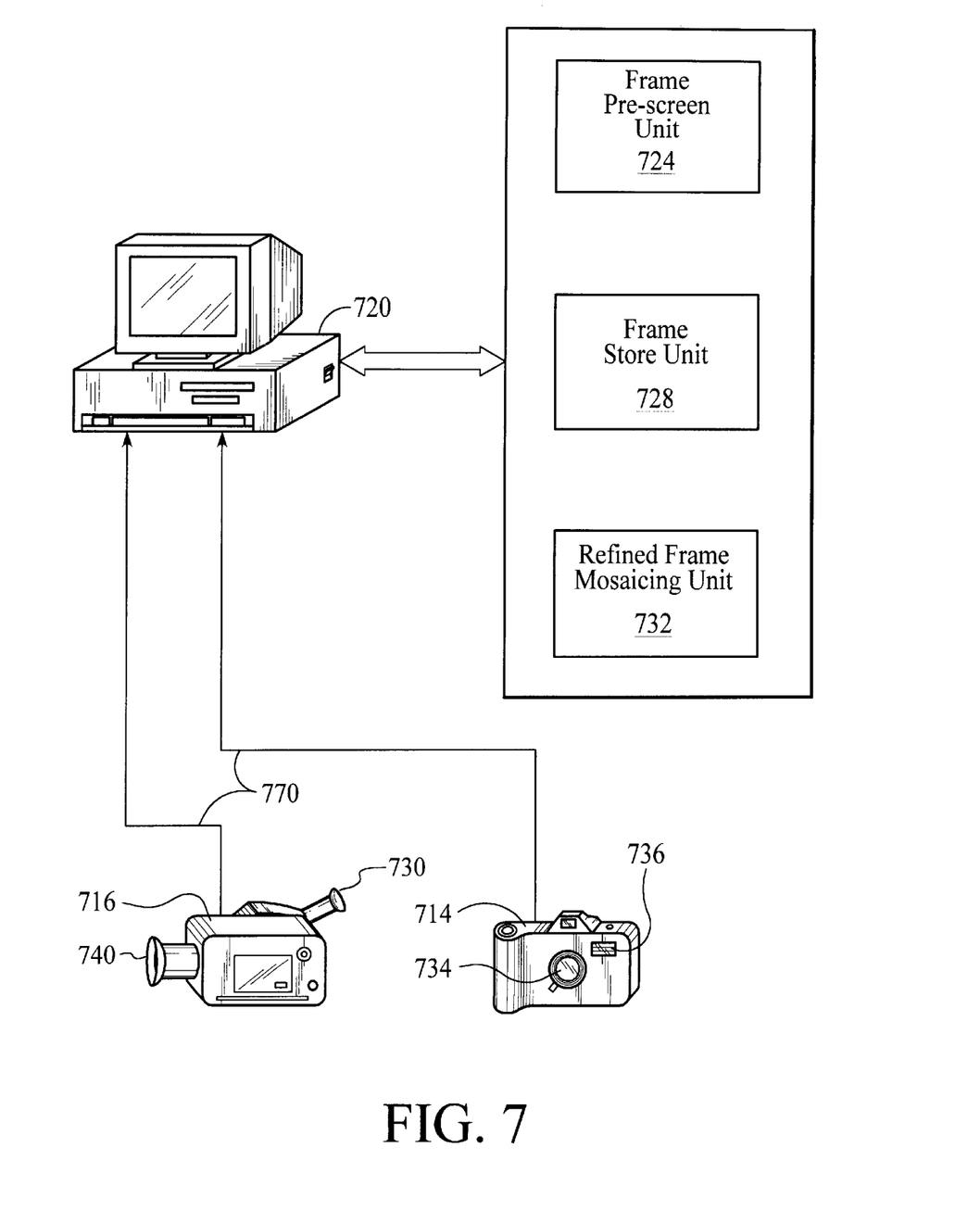
FIG. 7 is a depiction of an imaging capture device, such as a hand-held digital still camera or a hand-held digital video camera, that is directly connected to a support computer system, such as a personal computer, that includes a frame pre-screen unit, a frame store unit, and a refined frame mosaicing unit in accordance with another embodiment of the invention.

FIG. 7 is a depiction of another embodiment of an imaging system in which the frame pre-screen unit 724 and the frame store unit 728 are located within the personal computer 720 instead of the digital still camera 714 or the digital video camera 716. In the embodiment of FIG. 7, the functional units operate as described above with reference to FIG. 1 except that the camera (either the still or video camera) is linked 770 to the personal computer during image capture and the captured image frames are transferred directly to the personal computer for frame pre-screening and storage. The link between the cameras and the personal computer may include a wire link, an optical link, or a wireless link. In an embodiment of FIG. 7, a coarse image mosaic generated from the pre-screened image frames may be displayed in real-time through the personal computer or through the linked camera. The embodiment of FIG. 7 allows frame pre-screening to be accomplished with minimal, or no, hardware and software additions to the hand-held camera. Because the hand-held camera requires minimal hardware and software additions, the image mosaicing camera can be cost competitive with other mass-market digital cameras. In addition, because the coarse image mosaic can be displayed in real-time on the personal computer, real-time display of a coarse image mosaic can be accomplished even if the camera (for example a still camera) does not include an on-camera display.

Figure 8:
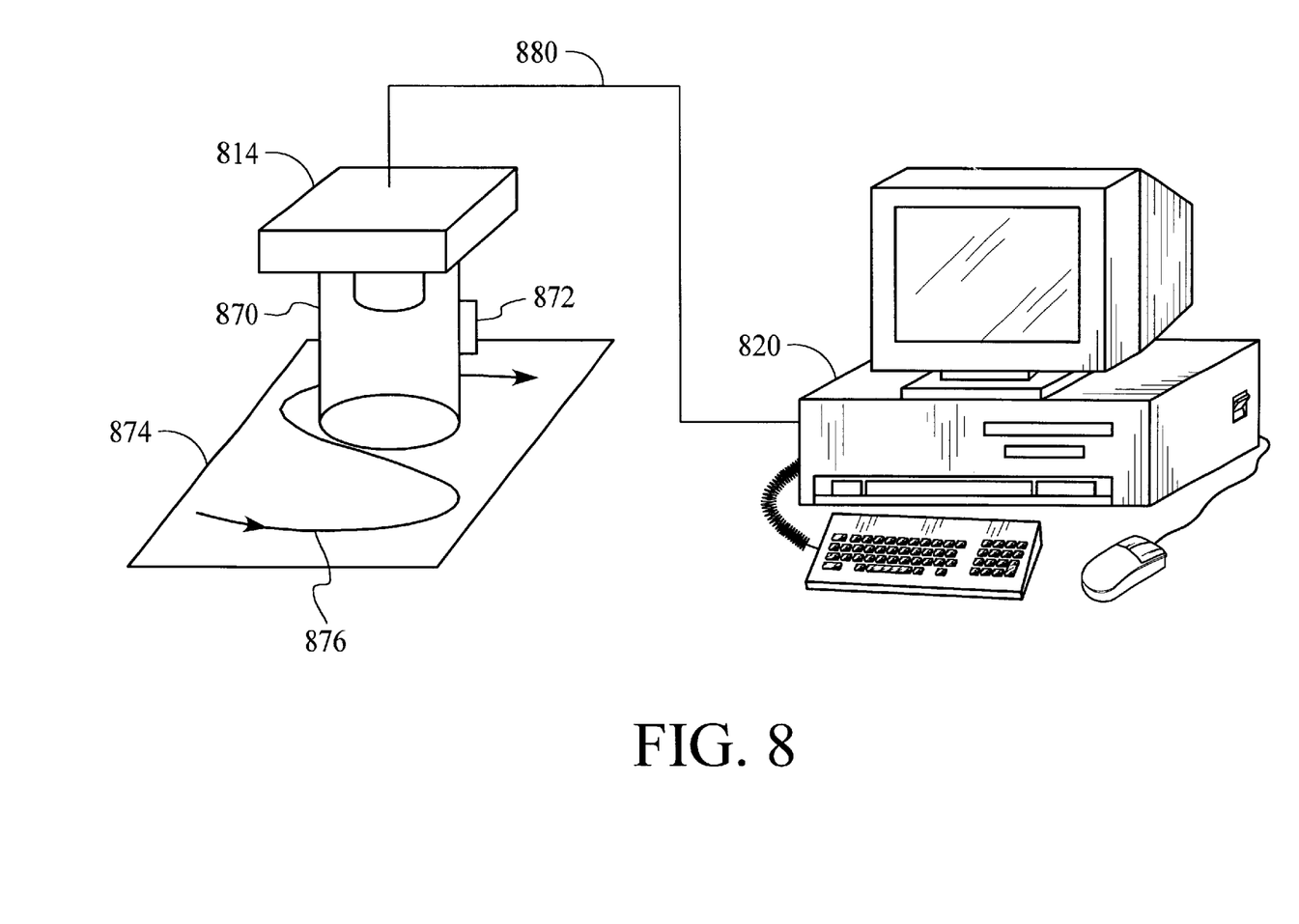
FIG. 8 is a depiction of an imaging system that includes a still camera and a support structure that are directly connected to a support computer system during frame capture.

FIG. 8 is an embodiment of an imaging system that is related to FIG. 7 in which a still camera 814 is utilized in conjunction with a support computer system 820 to create an image scanning system. In the embodiment of FIG. 8, the still camera is directly linked (via link 880) to the support computer system (personal computer) during the image capture and pre-screening processes. As shown in FIG. 8, a support structure 870 is utilized with the still camera to fix the distance between the camera and a target object 874, such as a piece of printed paper, which is to be scanned. The still camera or the support structure may also include a light source 872 as necessary to illuminate the target image. In other possible embodiments of the imaging system, a hand-held digital camera without a support element can be used. In addition although the direct link 880 is depicted as a wire link, the direct link may involve a wireless link.

In operation, the camera 814 of FIG. 8 is swept in a path 876 across the printed paper and image frames are captured. In an embodiment, image frames are captured at an interval of one thirtieth of a second. As described above with reference to FIG. 7, the camera captures image frames and directly transfers the captured image frames to the personal computer 820. The captured image frames are pre-screened by the frame pre-screen unit within the personal computer and pre-screened image frames and coarse motion vectors are generated. In an embodiment, a coarse image mosaic is generated from the pre-screened image frames and the coarse image mosaic is displayed in real-time through the personal computer. The real-time display of the coarse image mosaic enables an operator of the camera to determine if the target object has been adequately scanned. After the image frames are captured and pre-screened, the personal computer utilizes the pre-screened image frames and coarse motion vectors to create a refined image mosaic as described above with reference to FIG. 3 that can be viewed, printed, edited, and/or stored.

Figure 9:
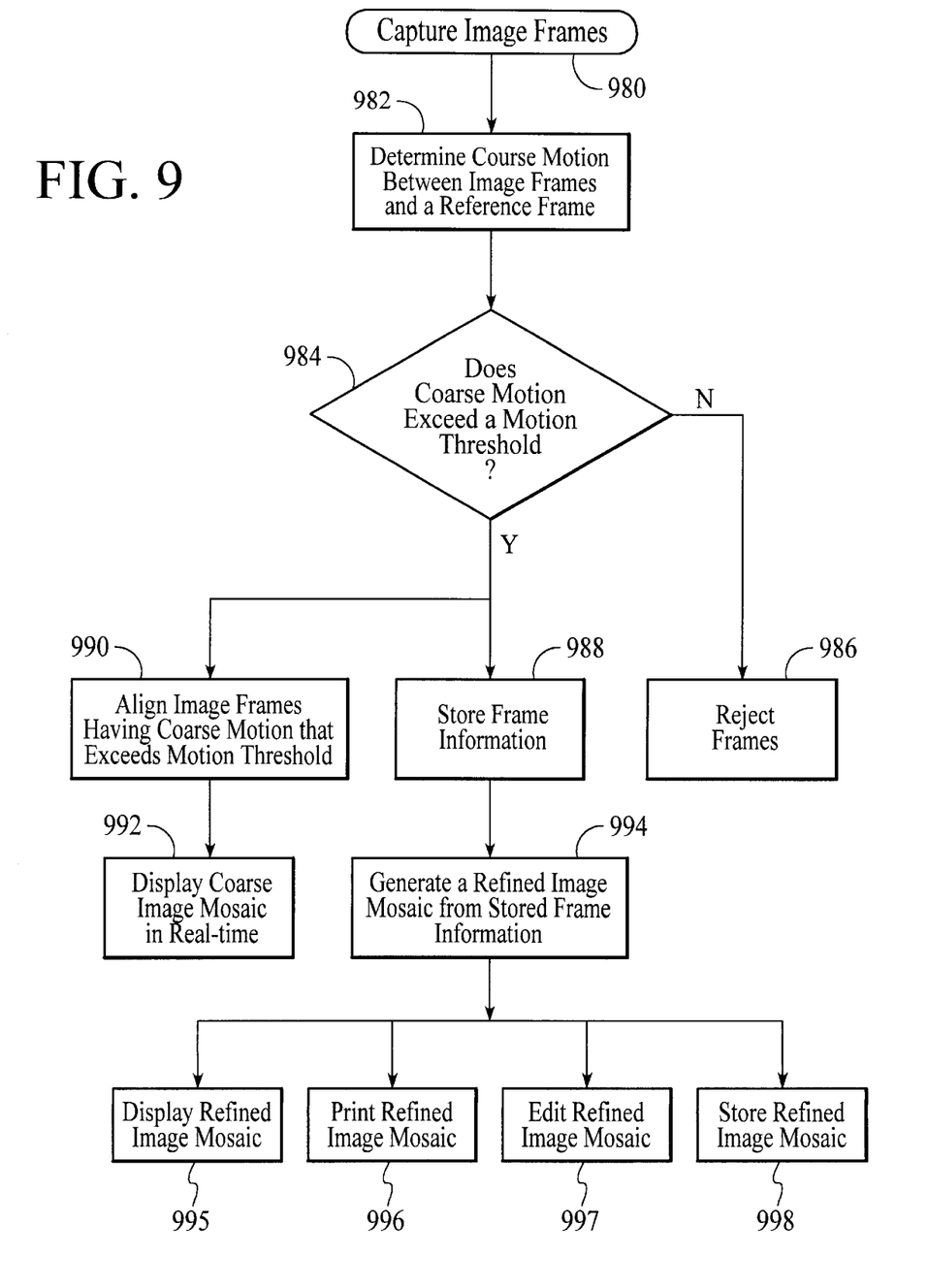
FIG. 9 is a process flow diagram of an image mosaicing method in accordance with an embodiment of the invention.

A process flow diagram of an image mosaicing method is provided in FIG. 9. In a step 990, image frames are captured. In a step 982, a coarse motion determination is made for a first image frame relative to a reference frame. In a step 984, the coarse motion for the first image frame is compared to a motion threshold. In a step 986, the first image frame is rejected if the coarse motion for the first image frame does not exceed the motion threshold. In a step 988, the first image frame is stored if the coarse motion for the first image frame exceeds the motion threshold.

In an additional step 990, image frames having coarse motion that exceeds the motion threshold are aligned to create a coarse image mosaic. In an additional step 992, the coarse image mosaic is displayed in real-time relative to the captured image frames.

In an additional step 994, a refined image mosaic is generated from image frames having coarse motion that exceeds the motion threshold. The refined image frame may be displayed 995, printed 996, edited 997, and/or stored 998 as desired.

What is claimed is:

1. An imaging system comprising:
   a camera that includes a lens and detector array for capturing image frames;
   means for pre-screening said image frames that are captured by said camera and for outputting pre-screened image frames;
   means for storing said pre-screened image frames that arm output from said pre-screening means; and
   means for generating a refined mosaic from said pre-screened image frames that are stored in said storage means;
   wherein said pre-screening means and said storing means are located within said camera wherein said pre-screening means includes: means for coarse motion tracking of said image frames that are captured by said camera, said coarse motion tacking means generating coarse motion vectors for said image frames; and means for rejecting a first image frame if said coarse motion vector for said first image frame does not exceed a motion threshold and for providing said first image frame to said storing means if said coarse motion vector does exceed said motion thresholds.

2. The imaging system of claim 1 wherein said means for pre-screening includes:
   means for generating a coarse image mosaic from said pre-screened image frames; and
   further including a display means for displaying said coarse image mosaic.

3. The imaging system of claim 2 wherein said coarse image mosaic is generated and displayed in real-time relative to said image frames that are captured by said camera.

4. The imaging system of claim 2 wherein said display means includes a display screen located within said camera.

5. The imaging system of claim 1 wherein said means for generating a refined mosaic includes a support computer system that supports an image mosaicing application.

6. A hand-held digital camera comprising:
   a lens and detector array for capturing image frames;
   means for prescreening said image frames that are captured by said detector array and for outputting pre-screened image frames;
   means for displaying a coarse image mosaic of said pre-screened image frames;
   means for storing said pre-screened image frames that are output from said pre-screening means; and
   means for transferring said pre-screened image frames from said storing means to a support system that generates a refined image mosaic from said pre-screened image frames wherein said means for pre-screening said image frames includes: means for coarse motion tracking of said image frames that are captured by said detector array, said coarse motion tacking means generating coarse motion vectors for said image frames; means for rejecting a first image frame if said coarse motion vector for said first image frame does not exceed a motion threshold and for providing said first image frame to said storing means if said coarse motion vector does exceed said motion threshold; and means for generating said coarse image mosaic from image frames having coarse motion vectors that exceed said motion threshold.

7. The hand-held digital camera of claim 6 wherein said pre-screening means generates said coarse image mosaic in real-time.

8. The hand-held digital camera of claim 6 further including a support element that locates said detector array a fixed distance away from an object that is to be imaged.

9. An imaging system comprising:
   a camera including;
      a lens and detector array for capturing image frames;
      a support computer system connected to said camera by a real-time communications link, said support computer system including;
      means for pre-screening said image frames that are captured by said camera and for outputting pre-screened image frames;
      means for generating a coarse image mosaic from said pre-screened image frames;
      means for storing said pre-screened image frames that are output from said pre-screening means;
      means for generating a refined image mosaic from said pre-screened image frames that are stored in said storage means; and
      a display for displaying said coarse image mosaic and said refined image mosaic;
   wherein said pre-screening means within said support computer system includes;
      means for coarse motion tracking of said image frames that are captured by said camera said coarse motion tracking means generating coarse motion vectors for said image frames; and
      means for rejecting a first image frame if said coarse motion vector for said first image frame does not exceed a notion threshold and for providing said first image frame to said storing means if said coarse motion vector does exceed said motion threshold.

10. The imaging system of claim 9 wherein said camera includes a display for displaying said coarse image mosaic in real-time.

11. The imaging system of claim 9 wherein said coarse image mosaic is generated and displayed in real-time on said support computer system display.

12. An image mosaicing method comprising the steps of:
    capturing image frames;
    making a coarse motion determination for a first image frame relative to a reference frame, said coarse motion determination being represented as a coarse motion vector;
    comparing said coarse motion vector for said first image frame to a motion threshold;
    rejecting said first image frame if said coarse motion vector for said first image frame does not exceed said motion threshold; and
    storing said first image frame if said coarse motion vector for said first image frame exceeds said motion threshold.

13. The image mosaicing method of claim 12 further including a step of aligning image frames having coarse motion vectors that exceed said motion threshold to crate a coarse image mosaic.

14. The image mosaicing method of claim 13 further including a step of displaying said coarse image mosaic in real-time.

15. The image mosaicing method of claim 14 further including a step of displaying said coarse image mosaic in real-time relative to said captured image frames.

16. The image mosaicing method of claim 12 further including a step of generating a refined image mosaic from image frames having coarse motion vectors that exceed said motion threshold.

17. An imaging system comprising:

a camera that includes a lens and detector array for capturing image francs;

means for pre-screening said image frames that are captured by said camera and for outputting pre-screened image frames;

means for storing said pre-screened image frames that are output from said pre-screening means; and means for generating a refined mosaic from said pre-screened image frames that are stored in said storage means;

wherein said pre-screening means includes:

means for coarse motion tracking of said image frames that are captured by said camera, said coarse motion tracking means generating coarse motion vectors for said image frames; and means for rejecting a first image frame if said coarse motion vector for said first image frame does not exceed a motion threshold and for providing said first image frame to said storing means if said coarse motion vector does exceed said motion threshold.

18. A hand-held digital camera comprising:

a lens and detector array for capturing image frames;

means for pre-screening said image frames that are captured by said detector array and for outputting pre-screened image frames;

means for displaying a coarse image mosaic of said pre-screened image frames;

means for storing said pre-screened image frames that are output from said pre-screening means; and means for transferring said prescreened image frames from said storing means to a support system that generates a refined image mosaic from said pre-screened image frames;

wherein said means for pre-screening said image frames includes:

means for coarse motion tracking of said image frames that are captured by said detector array, said coarse tracking means generating coarse motion vectors for said image frames;

means for rejecting a first image frame if said coarse motion vector for said first image frame does not exceed a motion threshold and for providing said first image frame to said storing means if said coarse motion vector does exceed said motion threshold; and means for generating said coarse image mosaic from image frames having coarse motion vectors that exceed said motion threshold.

19. An image mosaicing method comprising the steps of:

capturing image frames;

making a coarse motion determination for a first image frame relative to a reference frame, said coarse motion determination being represented as a coarse motion vector;

comparing said coarse motion vector for said first image frame to a motion threshold;

injecting said first image frame if said coarse motion vector for said first image frame does not exceed said motion threshold;

storing said first image frame if said coarse motion vector for said first image frame exceeds said motion threshold; and generating a refined image mosaic from image frames having coarse motion vectors that exceed said motion threshold.

* * * * *

UNITED STATES PATENT AND TRADEMARK OFFICE
CERTIFICATE OF CORRECTION

| | | |
|---|---|---|
| PATENT NO. | : 6,834,128 B1 | Page 1 of 1 |
| APPLICATION NO. | : 09/596133 | |
| DATED | : December 21, 2004 | |
| INVENTOR(S) | : Altunbasak et al. | |

It is certified that error appears in the above-identified patent and that said Letters Patent is hereby corrected as shown below:

In the Claims:

Column 9, line 22, in Claim 1 delete "arm output from said pre-screening means" and replace with --are output from said pre-screening means--.

Column 9, line 31, in Claim 1 delete "said coarse motion tacking means" and replace with --said coarse motion tracking means--.

Column 9, line 37, in Claim 1 delete "does exceed said motion thresholds" and replace with --does exceed said motion threshold--.

Column 10, line 1, in Claim 6 delete "said coarse motion tacking" and replace with --said coarse motion tracking--.

Column 10, line 43, in Claim 9 delete "exceed a notion threshold" and replace with --exceed a motion threshold--.

Column 11, line 1, in Claim 13 delete "motion threshold to crate a" and replace with --motion threshold to create a--.

Column 11, line 15, in Claim 17 delete "capturing image francs" and replace with --capturing image frames--.

Column 12, line 31, in Claim 19 delete "injecting said" and replace with --rejecting said--.

Signed and Sealed this
Twenty-ninth Day of March, 2016

Michelle K. Lee
*Director of the United States Patent and Trademark Office*